June 23, 1925.

A. E. HUTT 1,543,438

SILENT VALVE OPERATING MECHANISM

Filed Sept. 4, 1924  4 Sheets-Sheet 1

INVENTOR:
Albert E. Hutt.
BY
ATTORNEYS.

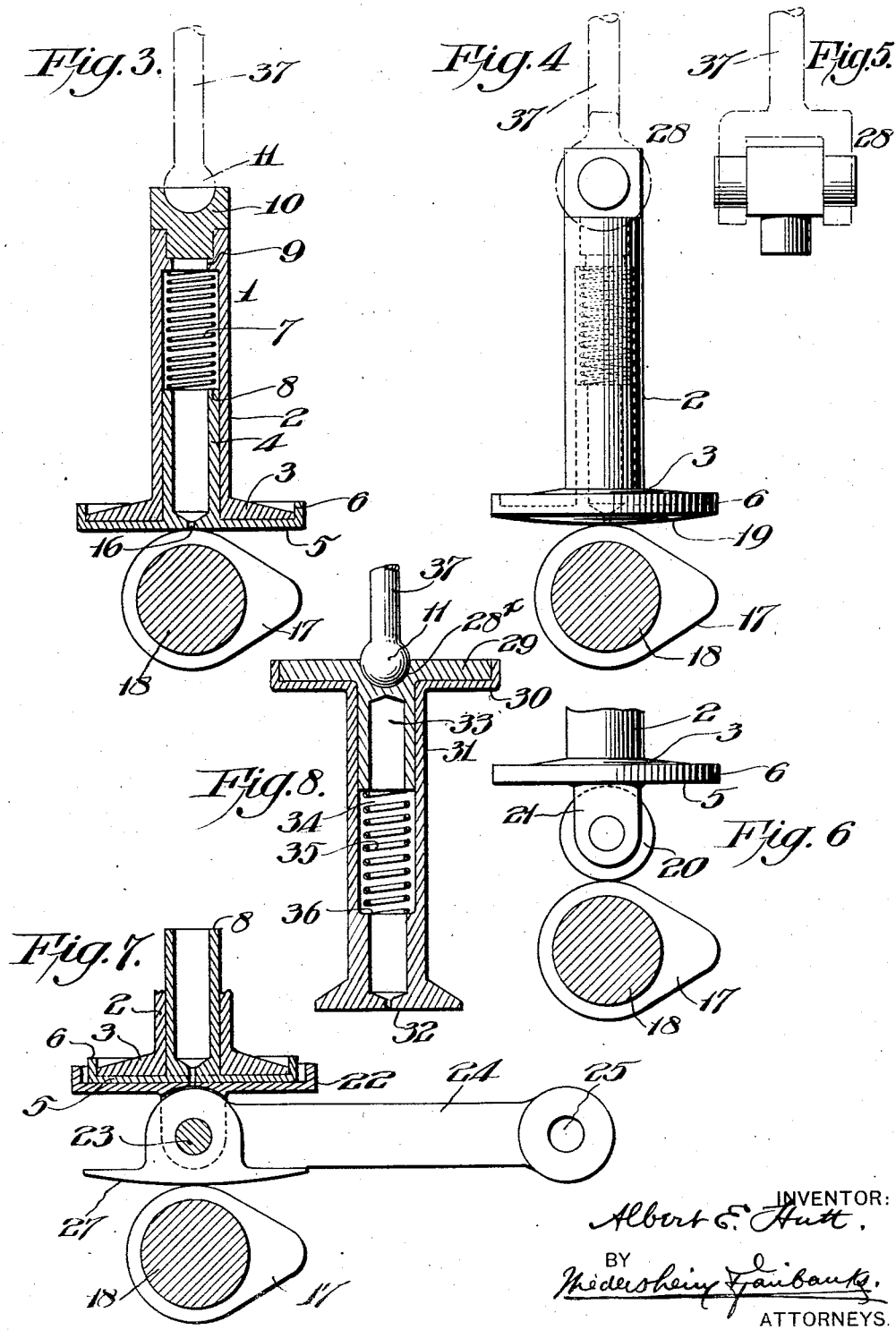

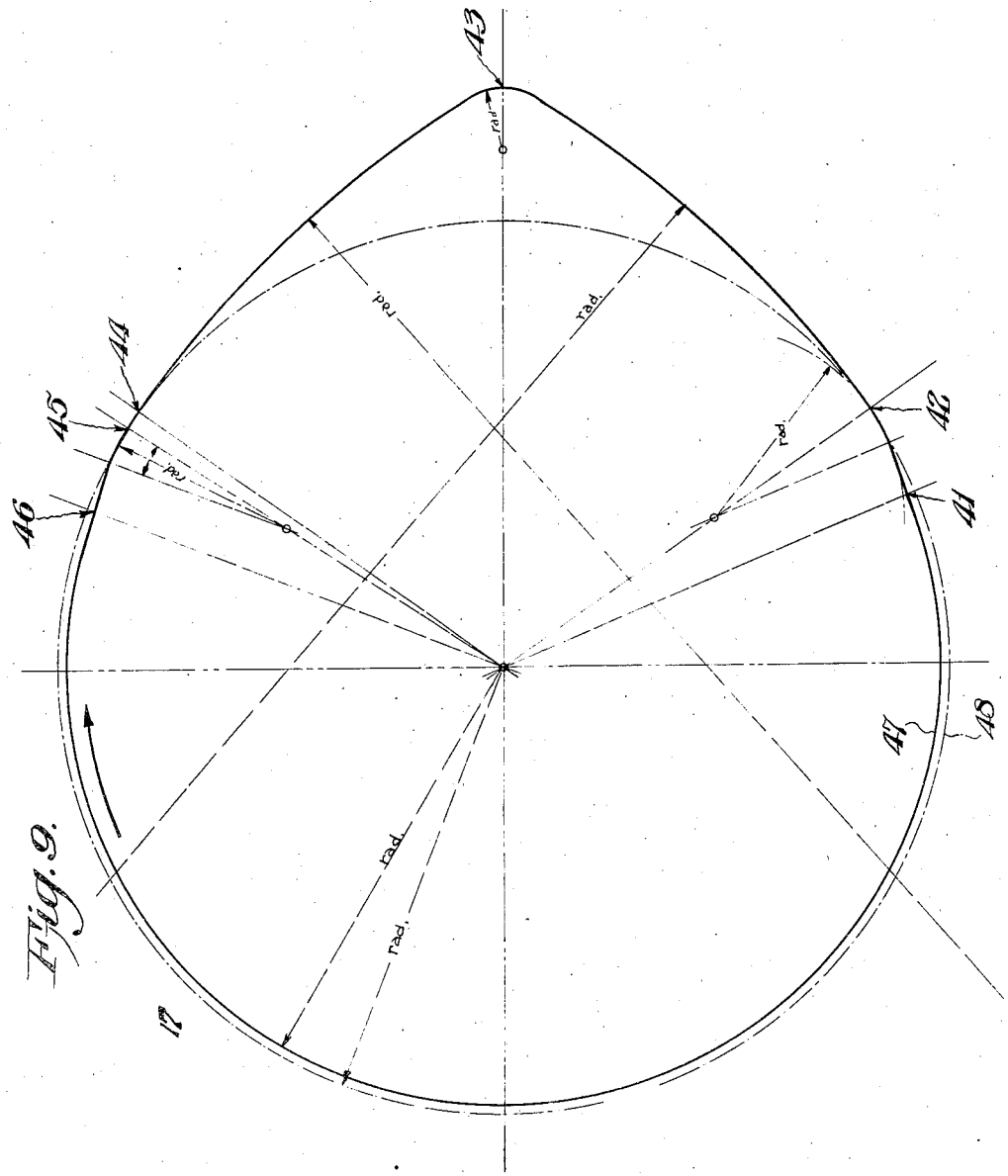

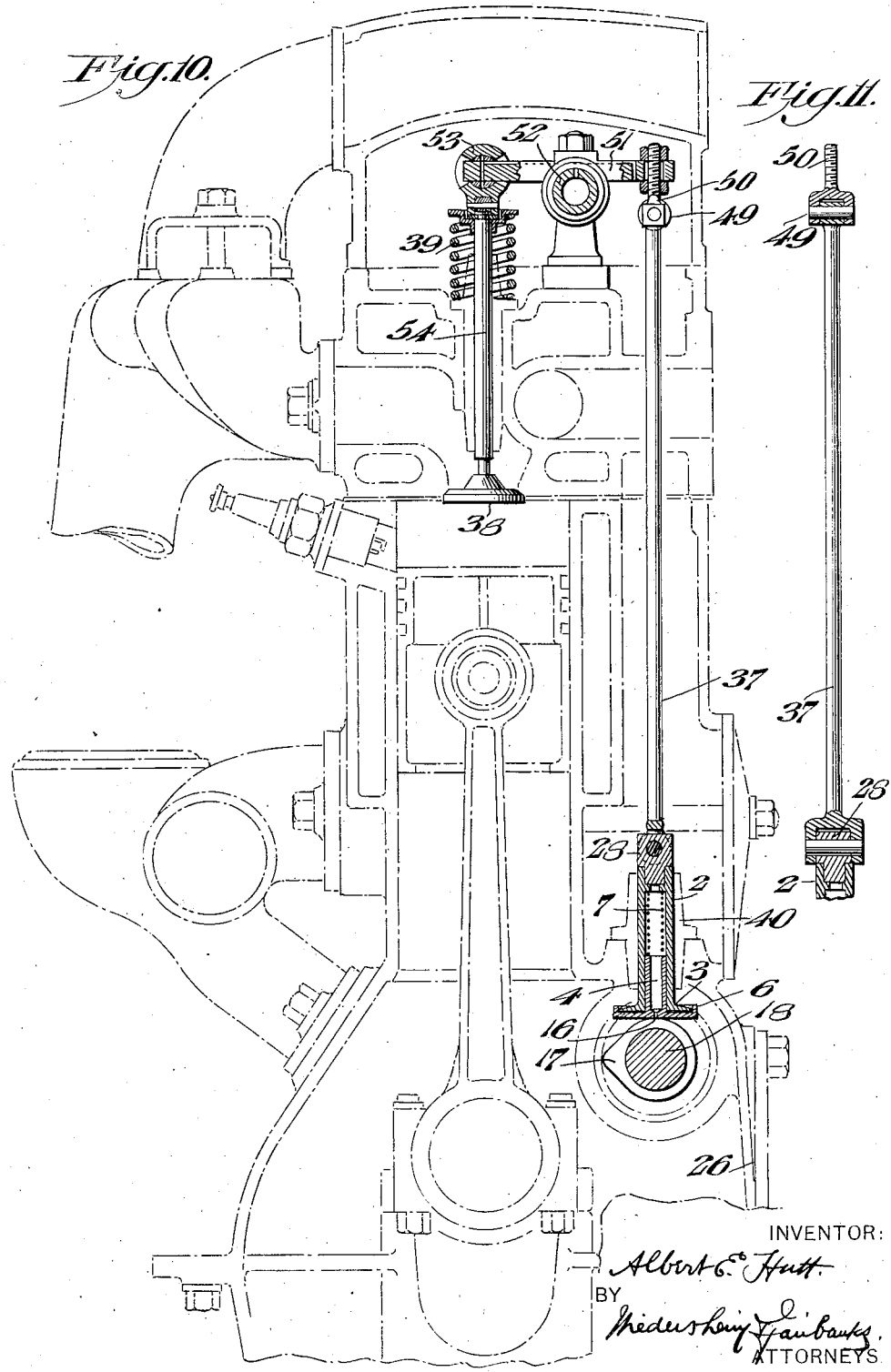

Patented June 23, 1925.

1,543,438

UNITED STATES PATENT OFFICE.

ALBERT E. HUTT, OF ARDMORE, PENNSYLVANIA.

SILENT VALVE-OPERATING MECHANISM.

Application filed September 4, 1924. Serial No. 735,755.

*To all whom it may concern:*

Be it known that I, ALBERT E. HUTT, a citizen of the United States, residing at Ardmore, county of Montgomery, State of Pennsylvania, have invented a new and useful Silent Valve-Operating Mechanism, of which the following is a specification.

My invention consists of a novel construction of a cam follower and its adjuncts for an internal combustion or other engine consisting of parts so made and assembled, that the clearance gap that is necessary in the valve operating mechanism to allow for the expansion of the various parts due to the heat generated in the engine, is made to occur within the said cam follower, which is so made and disposed that the closing of said gap is effected without the objectionable noise prevalent in other designs.

To the above ends my invention consists of an outer shell or sleeve with a flange at its lower end, an inner shell or sleeve sliding within said outer shell, also with a flange at its lower end, and a spring placed inside the outer shell and which is compressed by the end of the inner shell, when the latter is pushed into the former, so as to bring the two flanges in contact except for an intervening film of oil from the time the valve begins to open until said valve is closed, said flanges being slightly out of contact during the period said valve is closed.

It further consists of a valve operating mechanism embodying a novel construction of cam follower used in conjunction with a cam and other valve operating parts, all so designed and constructed that the break or gap which is allowed for expansion of the various parts due to the heat generated in the engine, occurs between parallel coacting metallic surfaces, which are part of said cam follower, and means provided so that the closing of said break or gap is affected without noise.

It further consists of other novel features of advantage and construction, all as will be hereinafter fully pointed out in the specification and claims.

For the purpose of illustrating my invention I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 3 represents on an enlarged scale a vertical sectional view of the cam follower and its adjuncts.

Figs. 4 and 5, represent side elevations of modified embodiments of my invention.

Fig. 6, represents a side elevation of another embodiment of my invention, wherein a friction roller is interposed between the cam follower and the actuating cam.

Fig. 7, represents a vertical sectional view, partly in elevation, showing another embodiment of my invention.

Fig. 8, represents a vertical sectional view of another embodiment of my invention.

Figure 9 represents an outline of the preferred form of cam employed.

Figures 10 and 11 represent elevations partly in section of the elements seen in Figures 4 and 5 together with their coacting parts, and showing my novel form of cam follower used in conjunction with closed joint intermediate said cam follower and valve.

Similar numerals of reference indicate corresponding parts.

Referring to the drawings:—

Figure 1:
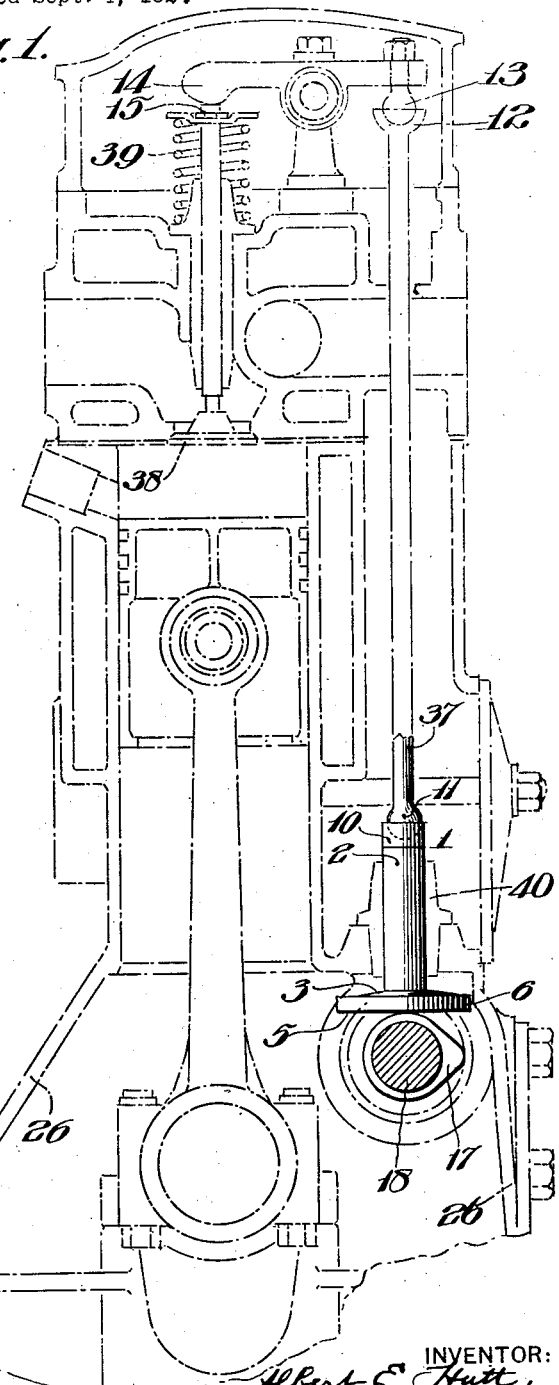
Fig. 1, represents a side elevation of my novel cam follower and its adjuncts, the coacting parts of the internal combustion engine and its adjuncts being shown in dotted lines, and the cam shaft being shown in section, said figure showing my invention as applied to a valve in head engine.
Figure 2:
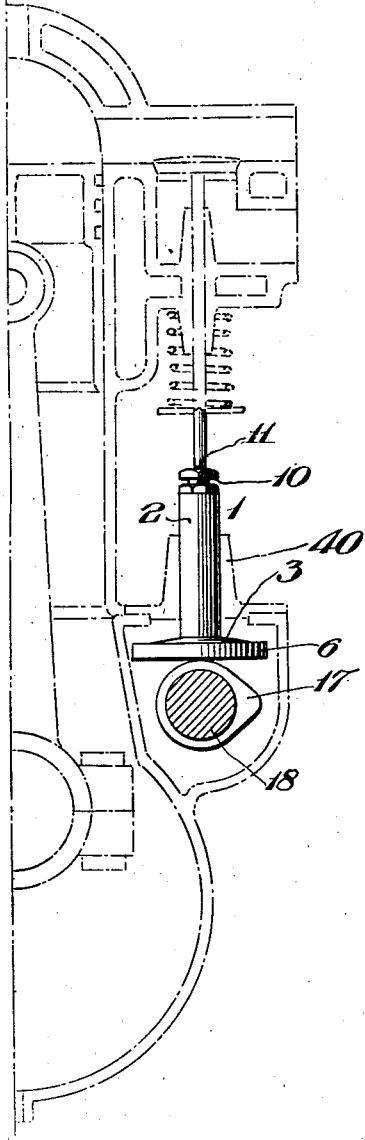
Fig. 2, represents a view similar to Fig. 1, showing my novel invention as applied to an L or T head engine.

In Fig. 1, have shown my novel cam follower as applied to a valve-in-head engine, while in Fig. 2, I have shown my invention as applied to an L or T head engine.

In carrying out my invention, which is applicable to any conventional type of poppet valve internal combustion engine, I employ a novel construction of cam follower 1, which comprises an outer shell or sleeve 2, having a flange 3 on its lower end. 4 designates an inner sleeve or rod sliding within said outer shell 2 which is provided with a bottom flange 5, having the peripheral oil retaining flange 6, which however, may be omitted if desired. 7 designates a spring contained within the outer shell 2 and having its lower end resting on the upper end 8 of the inner shell, and its upper end abutting against the shoulder 9 of said outer shell. When the parts are in the position seen in Fig. 3, the spring 7 is under compression, its function being to tend to separate the juxtaposed surfaces of the flanges 3 and 5. The spring has the further function of keeping the joints between the parts 10 and 11, 12 and 13 and 14 and 15, closed against opposing forces tending to open them.

The push rod 37 forms the actuating means between the upper portion of the cam follower and the rocker arm of the valve actuating means. It will thus be seen that the above mentioned spring is so made that it will overcome the inertia forces of the inner shell and the atmospheric pressure and surface tension of the oil between the two flanges 3 and 5, (both of which tend to keep said two flanges in contact once they have been brought into contact) thus assuring that the flange of the inner shell will remain in contact with the cam at all times.

It will further be seen that said spring will keep all open joints, such as ball and socket or their equivalents if such are used, in the train of valve operating parts closed during the neutral part of the cam action, that is, while the follower is contacting with the base circle of the cam.

By assuring that the base flange 5 of the inner shell is in constant contact with the cam and that no other joint breaks during a revolution of said cam, the break or gap provided for expansion is obviously bound to occur between the two flanges and these being so made and disposed and collocated that a silencing medium, as a film of oil or its equivalent, is interposed between their coacting surfaces, the closing of the gap which occurs just before the opening of the valve is effected without noise. 16 designates a port located in the flange 5 for the relief of air pressure engendered or oil within the outer shell 2. 17 designates a cam on the cam shaft 18, whereby the cam follower is actuated.

In Fig. 4, I have shown another embodiment of my invention, which is substantially the same as the construction seen in Fig. 3, except that I have shown the bottom of the flange 5 in the form of a spherical mushroom 19 instead of a flat mushroom as in Fig. 3. In Fig. 6 I have shown the flat mushroom seen in Fig. 3, as provided with a roller 20 journalled in the lugs 21, said roller contacting with the working face of the cam 17. In Fig. 7, I have shown the construction seen in Fig. 3 as seated in a pan 22, which is pivotally supported at 23, on the lever 24, which in turn may be pivoted at 25 to any suitable fixed point. The surface 27, which is integral with the lever 24 moves as a unit therewith, and is in contact with the cam 17. It will be understood that the upper portion of Fig. 7 is the same as the upper portion of Fig. 3.

In the upper part of Figs. 4 and 5, I have shown a form of joint 28 composed of the upper and lower members seen therein pivotally connected together, which may be substituted for the joint seen at 10 and 11 in Fig. 3, if desired.

In Figures 10 and 11 I have shown the construction seen in Figures 4 and 5 as collocated with the upper joint element 49 above which extends the threaded stem 50 adjustably connected to the rocker arm 51 fulcrumed at 52, and having flexible connection at 53 to the valve stem 54, these latter elements being similar to those shown in my contemporaneously pending application Serial No. 716,293, filed May 28, 1924. In Fig. 8 I have shown the ball 11 as seated in the socket $28^x$, in the flange 29, which is seated in the pan shaped member 30, having the pendant tubular extension 31, which terminates in the flange 32. The flange 29 has a pendant stem 33, which is contained in the chamber 34 and rests on the spring 35, whose bottom end rests on the wall 36.

It will be apparent that in all the embodiments of my invention the juxtaposed coacting metallic surfaces of the flanges 3 and 5 are in contact except for an intervening film of oil from the time the valve begins to open until said valve is closed and are out of contact during the period said valve is closed and there is no impact receiving member of yieldable material such as a cushioning disk interposed between said flanges.

The operation is as follows:

As the cam 17 rotates it raises the inner sleeve 4 compressing the spring 7 and closing the gap between the two flanges 3 and 5, after which the inner and outer shell raise as one unit and through the train of valve operating parts seen in Fig. 1 pushes on the valve stem 15 thus unseating and opening the valve 38. As the cam rotates still further, the follower 1 moves downwardly due to the pressure transmitted by the valve spring 39 through the train of valve operating parts, until the valve is seated, when the valve spring ceases to function. The train of valve operating parts at this time however, have inertia which tends to carry them all down still further a distance equal to the difference between the radii of the clearance and base circles of the cam 17. In my invention it is essential that only the inner shell in said construction as shown in Figs. 3, 4, 6 and 7 or outer shell shown in Fig. 8 should continue its travel, and that the other shell remain stationary, so that the gap shall occur between the two flanges and nowhere else. There are various ways of doing this, two of which I will now describe.

1. By making all joints between the valve stem and the outer shell closed joints such as shown in Fig. 10, or any other suitable joints.

2. By so designing and constructing the cam contour, that for a brief period after the valve has seated the follower would travel around the clearance circle which would bring all the train of moving parts in the valve operating mechanism to zero velocity thus nullifying the inertia forces acting on the valve operating parts, after which the contour of the cam would drop as desired to the base circle. The spring between the inner and outer shells is adequate to overcome both the inertia of the inner shell and the atmospheric pressure and surface tension of the oil between the two flanges and to withstand the weight of the outer shell and other parts used in the valve operating mechanism. It will be apparent from the lower portion of Fig. 1 that as the flanges 3 and 5 are contained in the crank case 26, that they will be effectively lubricated at all times and that there will be at all times a thin film of the lubricant contained between the juxtaposed surfaces of said flanges which will effectively serve as a silencing medium. The shell 2 and its adjuncts is guided in its movements in the bushing or its equivalent 40.

It will be evident that various types of cams 17 may be employed in conjunction with my novel cam follower, I however, prefer to employ the novel construction of cam seen in Figure 9, wherein the area 41 to 42 is that section of the cam contour or working face that raises the disc on the sleeve or rod a distance equal to the clearance allowed for expansion, and thereby brings the two parallel faces of the discs in contact. The area 42 to 43 is that section of the cam contour that opens the valve. The area 43 to 44 is that section of the cam contour that closes the valve. The area 44 to 45 is that section of the cam contour that follows the clearance circle and which therefore brings all the valve operating parts to rest or to zero velocity. The area 45 to 46 is that section of the cam contour that allows the inner sleeve or rod to drop to the base circle thereby providing the gap for expansion and assuring perfect closing of the valve.

47 designates the base circle, and 48 the clearance circle of the cam. In Figure 9 I have shown the preferred construction of the cam, the area 41 to 42 being a combination of a circular arc and a tangent to the base circle and to itself, the same form of construction being used for the area 45 to 46. It is evident however, that other forms of construction could be used with equally good results. The area 44 to 45 I have shown as following the clearance circle although it is evident that it could follow a concentric circle of greater or lesser radius within certain limits without interference with its operation, and I prefer in practice in order to get the best results to employ the cam hereinabove described.

Having thus described my invention what I claim as new and useful and desire to secure by Letters Patent, is:—

1. In a device of the character stated, a valve, a cam follower, an operating train intermediate said valve and cam follower, a spring take up in the latter, tending to produce the clearance within said cam follower only, in combination with a cam coacting with said cam follower and having a contour which brings the whole operating train to a standstill before producing said clearance, so that the spring take up will have to overcome the weight of the train alone and not the inertia forces.

2. In a valve operating mechanism, the combination of a valve, a cam for actuating said valve, a plurality of parts interposed between said valve and cam, including parallel coacting metallic surfaces in contact except for the intervening lubricant, means for bringing the various parts intermediate said valve and cam to a state of rest at approximately the time the valve seats, and a spring positioned to produce the expansion clearance between said parallel coacting metallic surfaces against the opposing static forces only after the various parts intermediate said cam and valve have been brought to a state of rest, and to overcome the inertia of the parts intermediate said spring and cam.

3. In a valve operating mechanism, the combination of a valve, a cam for actuating said valve, the contour of which produces a state of rest to the various parts intermediate said cam and valve at approximately the time the valve seats, a plurality of parts interposed between said valve and cam, including parallel coacting metallic surfaces in contact except for the intervening lubricant, means for providing oil between said parallel coacting metallic surfaces, and a spring to produce the clearance for expansion between said parallel coacting metallic surfaces against the opposing static forces only after the various parts intermediate said cam and valve have been brought to rest, and to overcome the inertia of the parts intermediate said spring and cam.

ALBERT E. HUTT.

Witnesses:
E. HAYWARD FAIRBANKS,
E. A. CORBING.